United States Patent
Morgulis

(10) Patent No.: US 9,227,246 B2
(45) Date of Patent: Jan. 5, 2016

(54) CUTTING TOOL FOR GROOVING AND PARTING OPERATIONS

(71) Applicant: Vargus Ltd., Nahariya (IL)

(72) Inventor: Rafael Morgulis, Karmiel (IL)

(73) Assignee: Vargus Ltd., Nahariya (IL)

( * ) Notice: Subject to any disclaimer, the term of this patent is extended or adjusted under 35 U.S.C. 154(b) by 320 days.

(21) Appl. No.: 13/648,569

(22) Filed: Oct. 10, 2012

(65) Prior Publication Data

US 2013/0089381 A1 Apr. 11, 2013

(30) Foreign Application Priority Data

Oct. 11, 2011 (EP) .................................... 11184720

(51) Int. Cl.
*B23B 27/16* (2006.01)
*B23B 27/04* (2006.01)
*B23C 5/20* (2006.01)

(52) U.S. Cl.
CPC ............. *B23B 27/04* (2013.01); *B23B 27/1614* (2013.01); *B23B 2200/162* (2013.01); *B23B 2200/166* (2013.01); *B23B 2205/12* (2013.01); *Y10T 407/22* (2015.01); *Y10T 407/2274* (2015.01)

(58) Field of Classification Search
CPC ............................. B23B 27/04; B23B 27/1622
USPC ............................................. 407/66, 67, 103
See application file for complete search history.

(56) References Cited

U.S. PATENT DOCUMENTS

| | | | | |
|---|---|---|---|---|
| 4,066,376 A * | 1/1978 | Eckle et al. | | 407/101 |
| 4,320,996 A * | 3/1982 | Roos | | 407/103 |
| 4,507,023 A * | 3/1985 | Shikata | | 407/103 |
| 5,551,811 A | 9/1996 | Satran et al. | | |
| 5,607,263 A | 3/1997 | Nespeta et al. | | |
| 5,888,029 A * | 3/1999 | Boianjiu | | 407/66 |
| 6,595,305 B1 | 7/2003 | Dunn et al. | | |
| 7,597,508 B2 * | 10/2009 | Hecht | | 407/101 |
| 7,972,090 B2 * | 7/2011 | Jonsson et al. | | 407/103 |

(Continued)

FOREIGN PATENT DOCUMENTS

| | | |
|---|---|---|
| DE | 25 10 960 A1 | 9/1976 |
| DE | 36 17 119 A1 | 11/1987 |

(Continued)

OTHER PUBLICATIONS

European Search Report issued in connection with corresponding European Patent Application No. 11184720.8.

*Primary Examiner* — Will Fridie, Jr.
(74) *Attorney, Agent, or Firm* — Akerman LLP

(57) ABSTRACT

A cutting tool for grooving and parting operations, comprising a tool holder provided at one of its side faces with a pocket in the shape of a polygon confined by a base support surface and at least a first and second side support surfaces projecting from the base support surface. A cutting insert is releasably securable in said pocket, said cutting insert being formed with a blade part and a base part with lateral surfaces protruding from the blade part. The base part is received in said pocket, such that a first and a second lateral surface of the base part contact the first side support surface and the second side support surface of the pocket, respectively. The first lateral surface is provided with a recess to the inside of the cutting insert, and the first side support surface is provided with a complementary projection to the inside of the cutting insert.

17 Claims, 3 Drawing Sheets

(56) References Cited

U.S. PATENT DOCUMENTS

| | | |
|---|---|---|
| 8,790,049 B2 * | 7/2014 | Chen .................... 407/113 |
| 2003/0059264 A1 | 3/2003 | Hansson et al. |
| 2004/0028486 A1 | 2/2004 | Englund |
| 2005/0129477 A1 | 6/2005 | Pantzar |
| 2007/0081873 A1 | 4/2007 | Blomstedt et al. |
| 2008/0152440 A1 * | 6/2008 | Andersson et al. ........... 407/103 |
| 2009/0324349 A1 * | 12/2009 | Andersson et al. ........... 407/103 |

FOREIGN PATENT DOCUMENTS

| | | |
|---|---|---|
| DE | 10 2006 017 458 A1 | 9/2007 |
| EP | 0 027 783 A1 | 4/1981 |
| EP | 0 616 867 A2 | 9/1994 |
| EP | 0 850 715 A1 | 7/1998 |

\* cited by examiner

CUTTING TOOL FOR GROOVING AND PARTING OPERATIONS

CROSS-REFERENCE TO RELATED APPLICATIONS

This application claims priority to European Patent Application No. 11184720.8, filed Oct. 11, 2011, the disclosure of which is hereby incorporated by reference in its entirety.

DESCRIPTION

The invention relates to a cutting tool for grooving and parting operations. The invention further relates to a cutting insert for a cutting tool.

Grooving operations, also referred to as groove turning or slotting operations, and parting operations, also referred to as cutoff operations, are outside turning operations, in which the cutting tool is usually advanced with respect to the workpiece machined after each revolution of the workpiece. In order to reduce a cycle time for a workpiece, the distance for advancing the cutting tool is chosen sufficiently large, which requires a high rigidity of the cutting insert and a reliable clamping system for fixing the cutting insert on a tool holder.

A cutting tool comprising a tool holder and a cutting insert for grooving and parting operations is described for example in EP 0 027 783 A1. The tool holder described in EP 0 027 783 A1 is provided at one of its side faces with a pocket confined by a base support surface and at side support surfaces upstanding therefrom. The cutting insert is releasably secured into said pocket by means of a centre screw threadably engageable with a transverse bore in the holder, wherein the insert is in the shape of a equilateral triangle, the central portion of which being a protrusion having a triangular shape and extending from the remainder of the insert whilst being received in said pocket, which pocket is complementarily shaped with regard to said protrusion, and said protrusion being angularly offset from the remainder of the insert.

It is the object of the application to provide a cutting tool and an insert therefore having a high rigidity in order to further reduce cycle times.

This object is achieved by a cutting tool for grooving and parting operations, comprising a tool holder, said tool holder having a top face, a bottom face, and two opposed longitudinally extending side faces, said tool holder being provided at one of its side faces with a pocket in the shape of a polygon confined by a base support surface and at least a first side support surface and a second side support surface projecting from the base support surface, the cutting tool further comprising a cutting insert releasably securable in said pocket, said cutting insert being formed with a blade part and a base part with lateral surfaces protruding from the blade part, which base part is received in said pocket, such that a first lateral surface and a second lateral surface of the base part contact the first side support surface and the second side support surface of the pocket, respectively, wherein the first lateral surface is provided with a recess to the inside of the cutting insert, and the first side support surface is provided with a complementary projection to the inside of the cutting insert.

The first lateral surface contacts the first side support surface in the region of the recess. The blade part is preferably a flat element of polygonal shape having at least one cutting corner projecting from the tool holder for the grooving or parting operation. In use, a cutting force is acting on the blade part. The side support surfaces restrict a motion of the cutting insert induced by the cutting force. As a result, the cutting insert is forced against a first contact region or contact point at the first side support surface and a second contact region or contact point at the second side support surface. The pocket is shaped such that a cutting force results in a torque or moment acting on the cutting insert about the second contact region or contact point at the second side support surface. In the context of the application, the term contact point is not to be understood as meaning only a zero-dimensional element, but includes also regions or areas in which two elements contact each other. Due to the moment acting on the cutting insert, a reaction force is applied in the contact region in which the first lateral surface of the insert contacts the first side support surface of the pocket. The reaction force is applied in normal direction of the surfaces in the contact region. By providing a recess and a complementary projection, a direction of the reaction force is influenced. For increasing the effectiveness of the reaction force, the angle between the direction of the reaction force is minimized. By providing a recess on the first lateral surface of the base part, a stopper is formed on said first lateral surface for restricting a rotational movement.

According to a preferred embodiment, the base part is in the shape of a regular polygon and comprises at least three equally shaped lateral surfaces. The regular polygonal shape of the base part allows the cutting insert to be indexed and positioned in the pocket with different regions of the blade part, in particular with different cutting corners provided on the blade part, projecting from the tool holder for the turning operation.

In one embodiment, the recess is formed with planar lateral surface sections. In preferred embodiments, at least the first lateral surface of the base part is concavely curved to the inside of the insert, whereas the first side support surface is convexly curved to the inside of the insert. The recess and the corresponding projection are formed by virtue of the curvature shapes. The curvature shapes allow a reliable positioning with high accuracy, which is less susceptible to manufacturing tolerances than a positioning of an insert having planar lateral surface sections. In case the base part is in the shape of a regular polygon, all lateral surfaces are concavely curved to the inside of the insert.

In still another embodiment, the blade part has a polygonal shape, which is the same type of polygonal shape as that of said base part but angularly offset therefrom. In the context of the application, the type of polygonal shape is defined by the number of main edges provided, wherein corners of the base part may be truncated forming additional corners and additional minor edges. In some embodiments, major side edges of the blade part are curved or angled. As mentioned above, the cutting insert in preferred embodiments is indexable for allowing different regions of the blade part to be used. When providing coinciding types of polygonal shapes, each cutting corner of the blade part is assigned one position of the cutting insert in the pocket.

In one embodiment, the blade part and the base part as well as the pocket are configured in the form of a four-corner regular polygon. In preferred embodiments, the blade part is in the shape or essentially in the shape of an equilateral triangle whereas said base part has a corresponding triangular or essentially triangular shape with an angular offset with regard to the shape of the blade part, which angular offset is set between about 10° and about 60°. As mentioned, in use, a cutting force is acting on the blade part, which results in a torque or moment acting on the cutting insert. In the contact region between the first side support surface and the first lateral surface a reaction force in a direction normal to the first side support surface is acting. The angular offset and the depth of the recess on the lateral surfaces or the convex curvatures of the lateral surfaces influences an angle between the direction of movement resulting from the moment applied by the cutting force and the direction of the reaction force. In one embodiment, the angular offset and the depth of the recess or the curvature are chosen in order to minimize the angle between the direction of movement and the direction of the reaction force. This allows for the stopper to become more effective, while decreasing the reaction force acting on the surfaces.

In one embodiment, the corners of the base part having a triangular or essentially triangular shape are truncated. By providing truncated corners, the effective size of the base part can be increased without increasing the overall size of the cutting insert.

In another embodiment, said pocket provided in the tool holder is in the shape of a V-shaped pocket with two side support surfaces, wherein the side support surfaces diverge towards the front and the top face of the tool holder such that an intermediate bisector of the two side support surfaces is inclined with respect to the longitudinal direction of said tool holder. In other words, the inside boundary of the pocket comprising the two side support surfaces is interrupted such that the pocket opens towards the front and the top face of the holder.

The tool holder may be used with various cutting inserts that have identical base parts corresponding to the shape of the pocket, but that differ in the size, in particular in the thickness of the blade part. In one embodiment, the blade part of the cutting insert projects from the tool holder when the base part is inserted in the pocket. In preferred embodiments, the tool holder is provided with an indention in the side face in which the pocket is located, wherein the depth of the indention is smaller than the depth of the pocket and wherein a portion of the blade part not in use is at least partly accommodated in the indention. As the cutting insert does not project from the tool holder, a safety of the cutting tool is increased.

The cutting insert may be fixed in the tool holder by magnetic force elements. In preferred embodiments, at least one fixing element is provided for securing the insert in the pocket, wherein preferably the at least one fixing element is a central screw threadably engageable with a tapped hole in the pocket.

The tool holder is preferably formed with a shank and a protrusion provided on the front end of the shank in which protrusion the pocket is formed. The shank and the protrusion are preferably designed as an integral element, wherein a cross sectional area of the protrusion may be chosen larger than that of the remainder of the tool holder, in particular of the shank. In a preferred embodiment, an edge between the top face and a front face of the tool holder is truncated. By truncating the edge of the tool holder, a clearance for a cutting corner in use of the blade part is provided. The truncation is preferably chosen so that it does not interfere with the area of the pocket in order to avoid a reduction of the base support surface.

The object is further solved by a cutting insert for a cutting tool having a blade part and a base part with lateral surfaces protruding from the blade part, wherein at least a first lateral surface of the base part is provided with a recess to the inside of the cutting insert. In preferred embodiments, the base part is in the shape of a regular polygon and comprises at least three equally shaped lateral surfaces. In addition or as an alternative, preferably at least the first lateral surface of the base part is concavely curved to the inside of the insert. In one embodiment, the blade part has a polygonal shape, which is the same type of polygonal shape as that of said base part but angularly offset therefrom. In preferred embodiments, the blade part is in the shape or essentially in the shape of an equilateral triangle whereas said base part has a corresponding triangular or essentially triangular shape with an angular offset with regard to the shape of the blade part, which angular offset is set between about 15° and about 50°.

Preferred embodiments are defined in the dependent claims.

In the following, an embodiment of the invention will be described in detail based on several schematic drawings in which FIG. 1 is a schematic isometric view of a cutting tool comprising a tool holder and a cutting insert;

Throughout the drawings, the same elements will be denoted by the same reference numerals.

Figure 1:
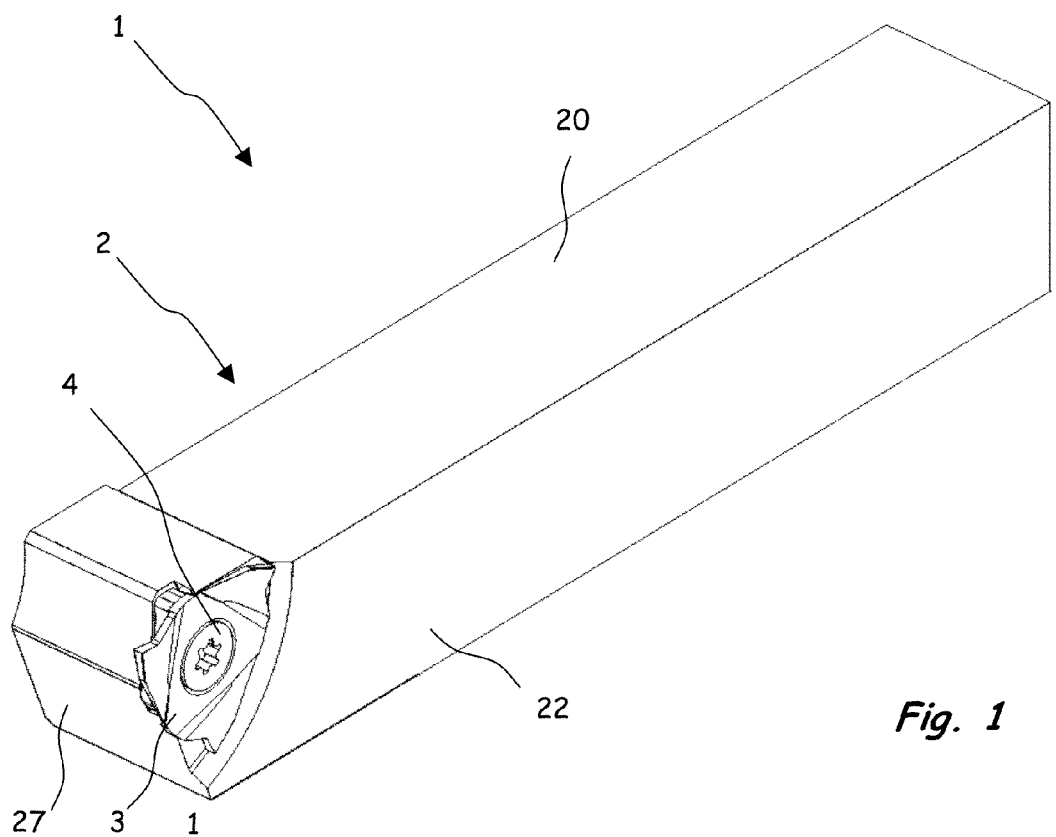
Figure 2:
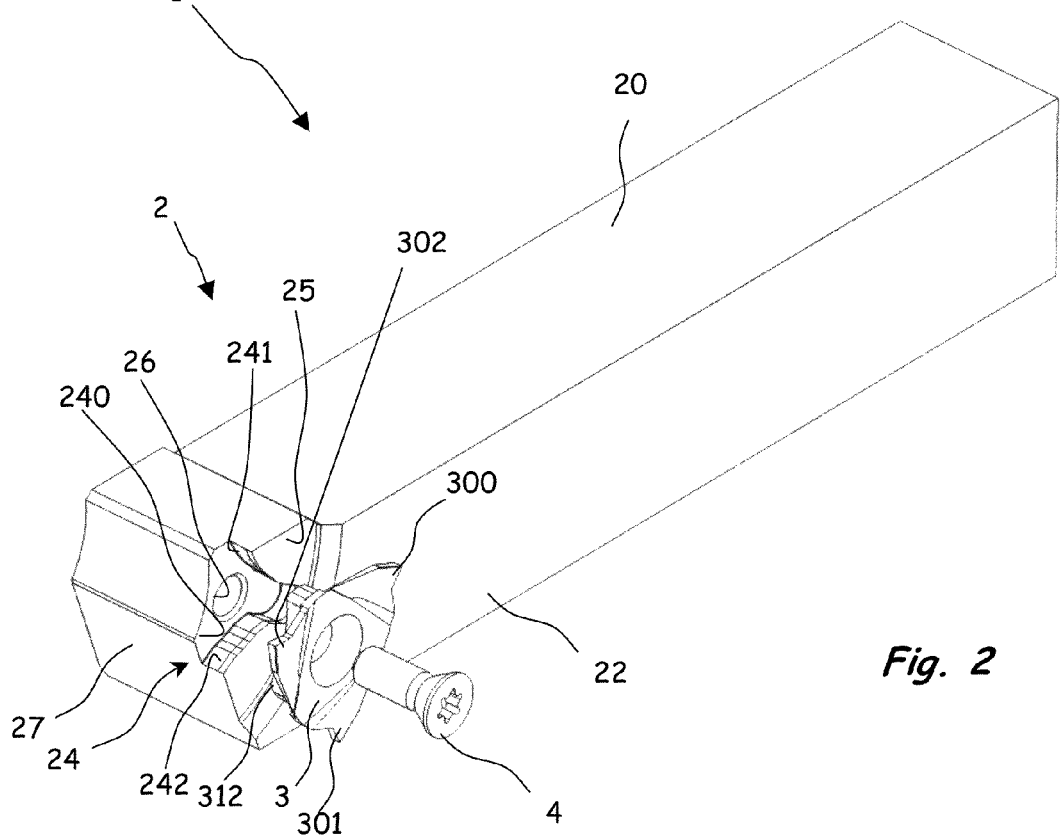
FIG. 2 is a schematic exploded isometric view of the cutting tool shown in FIG. 1.
Figure 3:
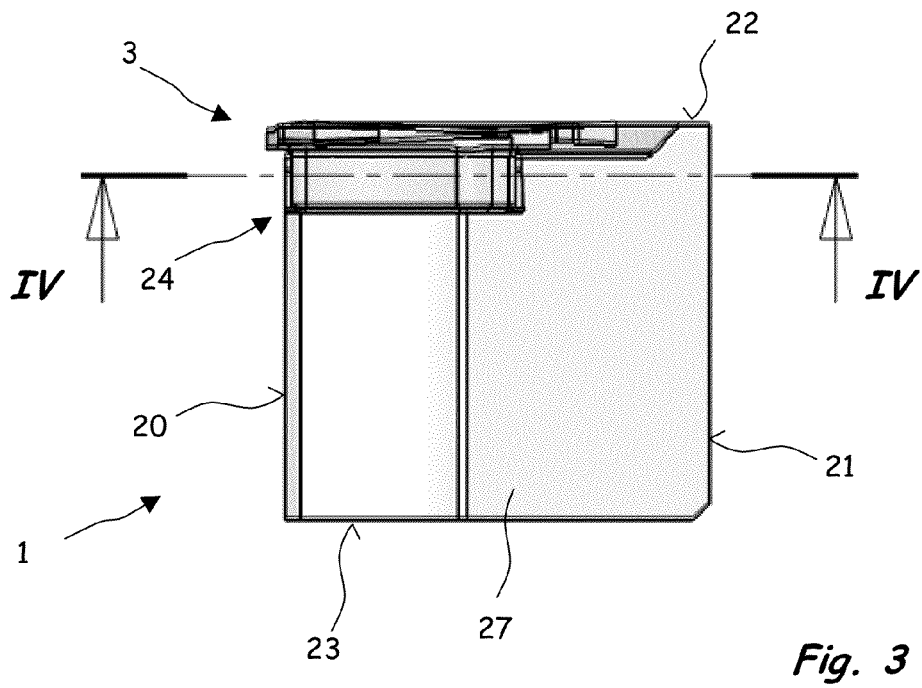
FIG. 3 is a schematic face view of the cutting tool shown in FIG. 1.

The cutting tool 1 shown in FIGS. 1 to 3 comprises a tool holder 2, a cutting insert 3 and a central screw 4. The tool holder 2 has an essentially rectangular cross-section and, thus, has a top face 20, a bottom face 21, and two opposed longitudinally extending side faces 22, 23.

At a front end, the tool holder 2 is provided at one of its side faces 22 with a pocket 24, which pocket 24 is a V-shaped pocket. As best seen in FIG. 2, the pocket 24 is confined by a base support surface 240 essentially in the shape of a triangle and a first side support surface 241 and a second side support surface 242 projecting V-shaped from the base support surface 240.

Figure 5:
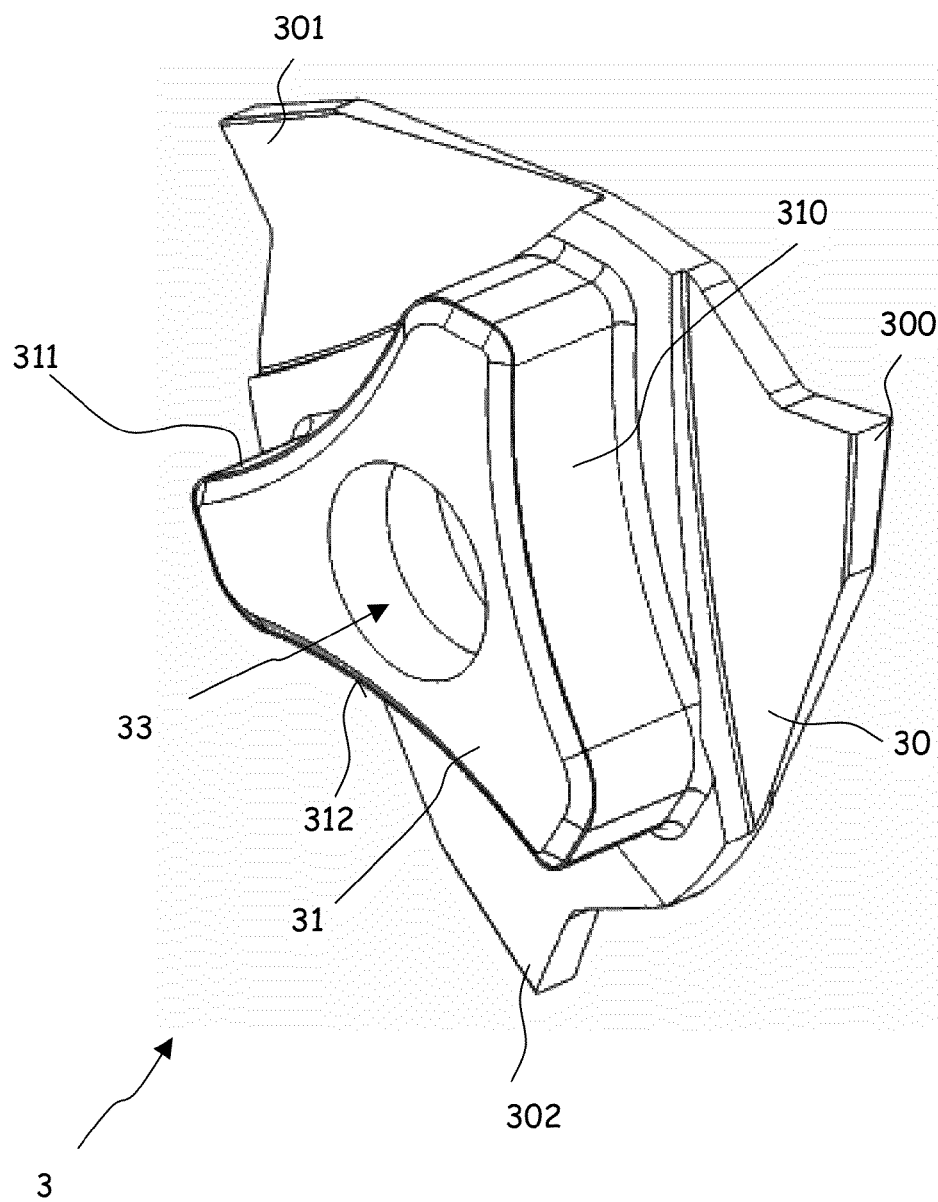
FIG. 5 is a schematic isometric view of a cutting insert used in the cutting tool shown in FIG. 1.

The cutting insert 3 is shown in detail in FIG. 5. As shown in FIG. 5, the cutting insert 3 is formed with a blade part 30 and a base part 31 having lateral surfaces 310, 311, 312 protruding from the blade part 31, which base part 31 is received in said pocket 24 (see FIG. 2), such that a first lateral surface 310 and a second lateral surface 311 of the base part 31 contact the first side support surfaces 241 and the second side support surfaces 242 of the pocket 24, respectively.

As illustrated in FIG. 5, the blade part 30 is essentially in the shape of an equilateral triangle with three cutting corners 300, 301, 302, whereas the base part 31 has also an essentially triangular shape with an angular offset with regard to the shape of the blade part 31. The tips of the base part 31 are truncated. As can be understood from the FIGS. 1 and 2, the depicted cutting insert 3 is indexable, such that the cutting insert 3 may be received in the pocket 24 in three different orientations, wherein in each orientation one of the three cutting corners 300, 301, 302 protrudes from the tool holder 2 and may be used for the turning operation.

As best seen in FIG. 2, the pocket 24 is in the shape of a V-shaped pocket with two side support surfaces 241, 242, wherein the side support surfaces 241, 241 diverge towards the front and the top face 20 of the tool holder 2 such that the intermediate bisector is inclined with respect to the longitudinal direction of said tool holder 2. As the pocket 24 opens out towards the front and the top face 20, one lateral surface 312 of the base part 31 (see FIG. 5), which corresponds to the cutting corner 302 in use, is not supported when the base part 31 is received in the pocket 24.

A front face 27 of the tool holder 2 is inclined and an edge between the top face 20 and a front face 27 of the tool holder 2 is truncated for increasing a clearance for the cutting corner 302 in use.

In the depicted embodiment, the tool holder 2 is provided with an indention 25 in the side face 22 in which the pocket 24 is located. The depth of the indention 25 is smaller than the depth of the pocket 24 and the cutting corners 300, 301 not in use are accommodated in the indention 25. By providing the indention 25, cutting corners 300, 301 not in use are protected. In other embodiments, the cross-sectional area of the tool holder is chosen to be constant, such that the cutting insert 3 protrudes from the side face 22 of the tool holder 2 whilst being received in the pocket 24. The respective cutting insert 3 is provided on the back side of the blade part 30 with a contact surface 34 that abuts the surface of the indention 25 when the cutting insert 3 is received in the pocket 24. The contact surface 24 is in the form of a truncated triangle, which is angular offset to the blade part 30 and the base part 31. The side edges of the blade part 30 are convexly curved to the outside.

The cutting insert 3 is provided with a through-hole 33 and secured in the pocket 24 using the central screw 4, which is threadably engageable with a tapped hole 26 in the pocket 24.

Figure 4:
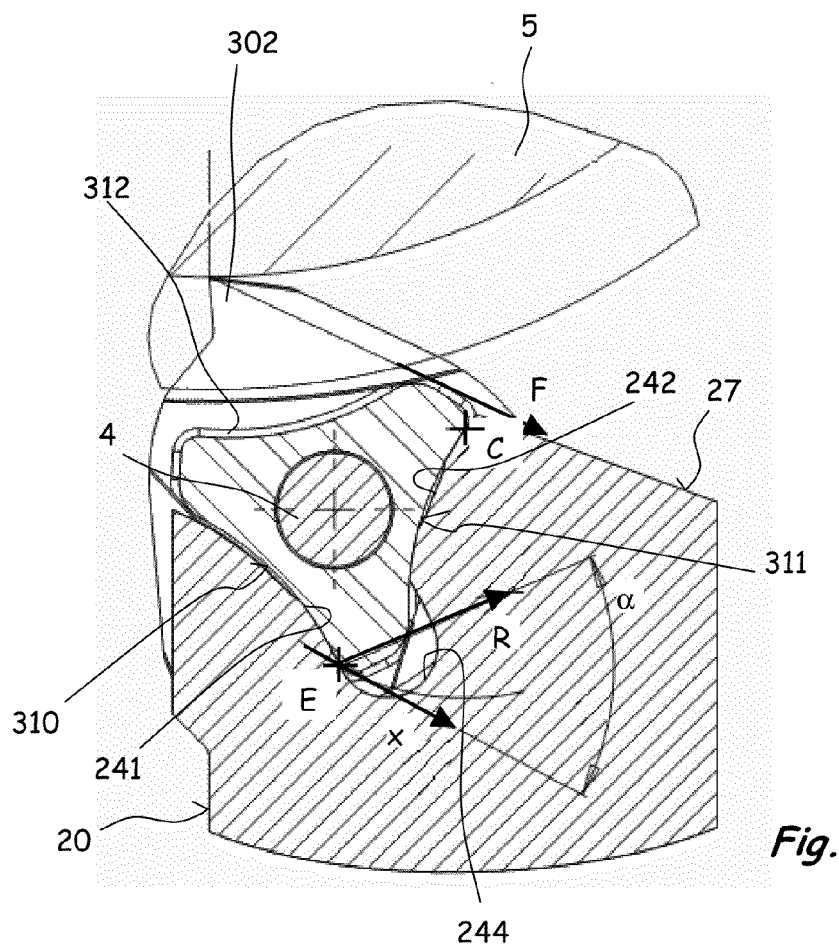
FIG. 4 is a schematic cross-sectional view of the cutting tool along a cross-sectional plane IV-IV according to FIG. 3.

FIG. 4 is a schematic cross-sectional view of the cutting tool 1 along a cross-sectional plane IV-IV according to FIG. 3, wherein a workpiece 5 machined is schematically depicted. During the machining, a cutting force F is acting on the cutting insert 3. The cutting force F causes a motion of the cutting insert 3, which motion is restricted by the rigid support surfaces 241, 242 of the pocket 24. More particular, the second lateral surface 311 of the cutting insert 3 contacts the second support surface 242 at a contact point C, wherein a turning moment or torque about the contact point C is applied. In other words, the contact point C is the centre of rotation of a moment induced by the cutting force F. Due to the elastic resilience of the centre screw 4, the centre of rotation generally does not coincide with the centre screw 4 but lies at the rigid support surface 242.

A contact in a contact area or contact point E between the first lateral surface 310 of the insert 3 and the first side support surface 241 counter acts a rotational displacement due to the moment about the centre of rotation C. In accordance with the application, the first lateral surface 310 of the insert 3 is provided with a recess to the inside of the cutting insert 3, and the first side support surface 241 is provided with a complementary projection to the inside of the cutting insert 3.

In the depicted embodiment, the base part 31 is in the shape of a regular polygon and comprises three equally shaped lateral surfaces 310, 311, 312. The lateral surface 310, 311, 312 of the base part are concavely curved to the inside of the cutting insert 3. The first side support surface 241 is convexly curved to the inside of the cutting insert 3. By virtue of the concavely curved shape of lateral surfaces 310, 311, 312 recesses to the inside of the cutting insert 3 are formed. Similar, by virtue of the convexly curved shape of the first side support surface 241 a complementary projection to the inside of the cutting insert 3 is provided.

A direction of movement of the cutting insert 3 in the contact point E due to a rotational displacement about the centre C is perpendicular to the connecting line between the contact point E and the centre C. A counter direction x to the direction of movement in the contact point E due to a rotational displacement about the centre C is indicated in FIG. 4. A reaction force R in the contact point E is exerted on the first side support surface 241 in normal direction of the first side support surface 241 in the contact point E.

The effectiveness of the reaction force at the contact point E between the first lateral surface 310 and the convexity of the first side support surface 241 depends on the angle $\alpha$ between the reaction force R and the direction of movement x. The closer angle $\alpha$ is to 0°, the smaller the reaction force R will be. In accordance with the invention, the angle $\alpha$ is influenced by providing a recess or curvature at the first lateral surface 310 of the cutting insert 3 and projection or curvature at the first side support surface 241 of the pocket 24. As will be understood by the person skilled in the art, the angle $\alpha$ may be optimized by choosing the depth or size of the recess or magnitude of the curvature of the first lateral surface 310 of the cutting insert 3. The angle $\alpha$ is further influenced by the angular offset between the blade part 30 and the base part 31. In preferred embodiments comprising the embodiment shown, the geometry is chosen such that the angle $\alpha$ lies between 15° and 50°.

As will be understood by the person skilled in the art, cutting inserts 3 may be provided that differ in the respective blade parts 30. In particular, cutting inserts 3 with blade parts 30 that differ in the thickness can be produced, wherein the thickness is chosen according to the requirement for a groove width in the machined work piece. Preferably, the base parts 31 of such cutting inserts 3 have essentially the same form and thickness to be used with the tool holder 1.

In the depicted embodiment, the pocket 24 is provided with a recessed area 244 between the first side support surface 241 and the second side support surface 242 to facilitate the manufacturing thereof.

The invention claimed is:

1. A cutting tool for grooving and parting operations, comprising:
a tool holder, said tool holder having a top face, a bottom face, and two opposed longitudinally extending side faces, said tool holder being provided at one of its side faces with a pocket in the shape of a polygon confined by a base support surface and at least a first side support surface and a second side support surface projecting from the base support surface; and
a cutting insert having an insert axis,
said cutting insert being releasably securable in said pocket with the insert axis perpendicular to the base support surface of said tool holder,
said cutting insert being formed with:
a blade part having a bottom surface and a top surface perpendicular to the insert axis and cutting corners with cutting edges extending in parallel to the insert axis between the top surface and the bottom surface; and
a base part having lateral surfaces protruding from the bottom surface of the blade part in a direction parallel to the insert axis and away from the top surface,
wherein the base part of the cutting insert is received in said pocket, such that a first lateral surface and a second lateral surface of the base part contact the first side support surface and the second side support surface of the pocket, respectively,
wherein the lateral surfaces are provided with a recess to the inside of the cutting insert, and the first side support surface is provided with a complementary projection to the inside of the cutting insert.

2. The cutting tool according to claim 1, wherein the base part is in the shape of a regular polygon and comprises at least three equally shaped lateral surfaces.

3. The cutting tool according to claim 1, wherein at least the first lateral surface of the base part is concavely curved to the inside of the cutting insert, whereas the first side support surface is convexly curved to the inside of the cutting insert.

4. The cutting tool according to claim 2, wherein the blade part has a polygonal shape, which is the same type of polygonal shape as that of said base part but angularly offset therefrom.

5. The cutting tool according to claim 2, wherein the blade part is in the shape or essentially in the shape of an equilateral triangle whereas said base part has a corresponding triangular or essentially triangular shape with an angular offset with regard to the shape of the blade part.

6. The cutting tool according to claim 5, wherein the angular offset is set between about 10° and about 60°.

7. The cutting tool according to claim 5, wherein corners of the base part having a triangular or essentially triangular shape are truncated.

8. The cutting tool according to claim 5, wherein said pocket is in the shape of a V-shaped pocket with two side support surfaces, wherein the side support surfaces diverge towards the front and the top face of the tool holder such that the intermediate bisector is inclined with respect to the longitudinal direction of said tool holder.

9. The cutting tool according to claim 1, wherein the tool holder is provided with an indention in the side face in which indention the pocket is located, wherein the depth of the indention is smaller than the depth of the pocket and wherein a portion of the blade part not in use is at least partly accommodated in the indention.

10. The cutting tool according to claim 1, wherein at least one fixing element is provided for securing the insert in the pocket, wherein preferably the at least one fixing element is a central screw threadably engageable with a tapped hole in the pocket.

11. The cutting tool according to claim 1, wherein an edge between the top face and a front face of the tool holder is truncated.

12. The cutting insert for a cutting tool according to claim 1, said cutting insert having an insert axis and comprising a blade part having a bottom surface and a top surface perpendicular to the insert axis and cutting corners with cutting edges extending in parallel to the insert axis between the top surface and the bottom surface and a base part having lateral surfaces protruding from the bottom surface of the blade part in a direction parallel to the insert axis and away from the top surface, wherein the lateral surfaces of the base part are provided with a recess to the inside of the cutting insert.

13. The cutting insert according to claim 12, wherein the base part is in the shape of a regular polygon and comprises at least three equally shaped lateral surfaces.

14. The cutting insert according to claim 12, wherein at least the first lateral surface of the base part is concavely curved to the inside of the cutting insert.

15. The cutting insert according to claim 13, wherein the blade part has a polygonal shape, which is the same type of polygonal shape as that of said base part but angularly offset therefrom.

16. The cutting insert according to claim 12, wherein the blade part is in the shape or essentially in the shape of an equilateral triangle whereas said base part has a corresponding triangular or essentially triangular shape with an angular offset with regard to the shape of the blade part, which angular offset is preferably set between about 10° and about 60°.

17. The cutting insert according to claim 16, wherein the angular offset is set between about 10° and about 60°.

* * * * *